US008922588B2

(12) United States Patent
Makino et al.

(10) Patent No.: US 8,922,588 B2
(45) Date of Patent: Dec. 30, 2014

(54) INFORMATION PROCESSING PROGRAM, INFORMATION PROCESSING SYSTEM, INFORMATION PROCESSING APPARATUS, AND INFORMATION PROCESSING METHOD, UTILIZING AUGMENTED REALITY TECHNIQUE

(75) Inventors: Kozo Makino, Kyoto (JP); Keisuke Kikuchi, Yokohama (JP); Yutaka Fukaya, Yokohama (JP); Yosuke Usui, Yashio (JP); Haruhisa Ito, Yokohama (JP)

(73) Assignee: Nintendo Co., Ltd., Kyoto (JP)

( * ) Notice: Subject to any disclaimer, the term of this patent is extended or adjusted under 35 U.S.C. 154(b) by 144 days.

(21) Appl. No.: 13/366,798

(22) Filed: Feb. 6, 2012

(65) Prior Publication Data
US 2013/0050194 A1    Feb. 28, 2013

(30) Foreign Application Priority Data
Aug. 31, 2011   (JP) .................................. 2011-189097

(51) Int. Cl.
*G09G 5/00*   (2006.01)
*G06T 19/00*   (2011.01)

(52) U.S. Cl.
CPC .................................. *G06T 19/006* (2013.01)
USPC ........................................ 345/633; 345/473

(58) Field of Classification Search
CPC ........... G06K 9/32; G06K 9/78; H04N 13/02; H04N 13/04; G09G 5/00; G06T 15/00
USPC .......... 345/633, 419, 473; 382/100, 103, 170, 382/181, 190; 348/51
See application file for complete search history.

(56) References Cited

U.S. PATENT DOCUMENTS 6,937,255 B2 *   8/2005   Fukuda et al. ................. 345/633
7,274,380 B2   9/2007   Navab et al.
(Continued)

FOREIGN PATENT DOCUMENTS

WO   WO2009054619 A2 *   4/2009   ................ G06F 3/00

OTHER PUBLICATIONS

Hirokazu Kato, "Marker Tracking and HMD Calibration for a Video-based Augmented Reality Conferencing System", Augmented Reality, 1999. Proceedings 2nd IEEE and ACM International Workshop on Augmented Reality (IWAR'99).*

(Continued)

*Primary Examiner* — Ryan R Yang
*Assistant Examiner* — Michael Le
(74) *Attorney, Agent, or Firm* — Nixon & Vanderhye, P.C.

(57) ABSTRACT

An exemplary embodiment provides an information processing program. The information processing program includes image obtaining instructions, search target detection instructions, event occurrence instructions, virtual image generation instructions, and display control instructions. The search target detection instructions cause a computer to detect a search target from an image of a subject. The event occurrence instructions cause the computer to cause an event to occur in a virtual space in accordance with variation in number of search targets. The virtual image generation instructions cause the computer to generate a virtual image by shooting the event with a virtual camera arranged in the virtual space. The display control instructions cause a display to display the virtual image such that the virtual image is visually recognized by a user as superimposed on the image of the subject or on the subject seen through a screen of the display.

15 Claims, 16 Drawing Sheets

(56) References Cited

U.S. PATENT DOCUMENTS

| | | |
|---|---|---|
| 7,911,503 B2 | 3/2011 | Kobayashi |
| 7,925,117 B2 | 4/2011 | Hamza et al. |
| 8,212,813 B2 * | 7/2012 | Furuhashi ............... 345/421 |
| 8,253,105 B1 * | 8/2012 | Warnke et al. ......... 250/339.04 |
| 8,553,938 B2 | 10/2013 | Makino et al. |
| 2002/0084974 A1 * | 7/2002 | Ohshima et al. ............. 345/156 |
| 2005/0168486 A1 * | 8/2005 | Sato et al. ................ 345/633 |
| 2008/0292131 A1 * | 11/2008 | Takemoto et al. ........... 382/100 |
| 2011/0304710 A1 | 12/2011 | Ito et al. |
| 2012/0050326 A1 * | 3/2012 | Tanaka .................... 345/633 |
| 2012/0075424 A1 | 3/2012 | Kawamoto et al. |
| 2012/0094773 A1 | 4/2012 | Suzuki |
| 2013/0050500 A1 | 2/2013 | Makino et al. |

OTHER PUBLICATIONS

Jul. 18, 2013 Notice of Allowance in U.S. Appl. No. 13/366,833, 11 pages.

Kato et al., "An Augmented Reality System and its Calibration based Marker Tracking", *Transactions of the Virtual Reality Society of Japan*, 1999, vol. 4, No. 4 w/ English Abstract, 10 pages.

Office Action mailed Apr. 25, 2014 in U.S. Appl. No. 13/366,866 (19 pages).

* cited by examiner

INFORMATION PROCESSING PROGRAM, INFORMATION PROCESSING SYSTEM, INFORMATION PROCESSING APPARATUS, AND INFORMATION PROCESSING METHOD, UTILIZING AUGMENTED REALITY TECHNIQUE

This nonprovisional application is based on Japanese Patent Application No. 2011-189097 filed with the Japan Patent Office on Aug. 31, 2011, the entire contents of which are hereby incorporated by reference.

TECHNICAL FIELD

The technology presented herein generally relates to an information processing program, an information processing system, an information processing apparatus, and an information processing method, utilizing an augmented reality technique.

BACKGROUND AND SUMMARY

An image pick-up apparatus such as a camera has conventionally employed a technique for detecting a prescribed image pick-up target from a picked-up image of a subject (picked-up image). For example, in an augmented reality technique, a technique for detecting a marker by subjecting a marker (a search target) included in an image picked up by a camera to image recognition processing (a marker detection technique) has been known.

An exemplary embodiment provides an information processing program, an information processing system, an information processing apparatus, and an information processing method, capable of providing more visual effects for having a user actually feel augmented reality by making use of a detected marker (a search target).

An exemplary embodiment provides a non-transitory storage medium encoded with a computer readable information processing program and executable by a computer of an information processing apparatus. The information processing apparatus is connected to an image pick-up apparatus and a display. The information processing program includes image obtaining instructions, search target detection instructions, event occurrence instructions, virtual image generation instructions, and display control instructions. The image obtaining instructions cause the computer to obtain an image of a subject picked up by the image pick-up apparatus. The search target detection instructions cause the computer to detect a search target from the image of the subject obtained in accordance with the image obtaining instructions. The event occurrence instructions cause the computer to cause an event to occur in a virtual space in accordance with variation in number of the search targets that can be detected in accordance with the search target detection instructions. The virtual image generation instructions cause the computer to generate a virtual image by shooting the event that occurs in accordance with the event occurrence instructions with a virtual camera arranged in the virtual space. The display control instructions cause the display to display the virtual image such that it is visually recognized by a user as superimposed on the image of the subject or on the subject seen through a screen of the display.

According to the exemplary embodiment, since an event is caused to occur in the virtual space in accordance with variation in number of search targets that can be detected, more visual effects for having the user actually feel augmented reality by utilizing the search target can be provided.

In an exemplary embodiment, the search target includes a first search target and a second search target arranged as encompassed in the first search target, and the event occurrence instructions are adapted to cause the event to occur in accordance with the number of the first search targets and the second search targets that can be detected in accordance with the search target detection instructions.

According to the exemplary embodiment, by detecting the second search target arranged as encompassed in the first search target, more visual effects for having the user actually feel augmented reality by further utilizing the search target can be provided.

In an exemplary embodiment, the event occurrence instructions are adapted to cause a first event to occur when the first search target and the second search target is successfully detected in accordance with the search target detection instructions, and to cause a second event to occur when only the second search target is successfully detected in accordance with the search target detection instructions, subsequent to occurrence of the first event.

According to the exemplary embodiment, since different events are caused to occur in accordance with variation in number of detected search targets, more visual effects for having the user actually feel augmented reality can be provided. For example, the first event may be caused to occur when both of the first search target and the second search target is successfully detected, and thereafter, second event may be caused to occur when the first search target is not detected but only the second search target is successfully detected, for example, by arranging an object in a real world over the first search target. The first event may be caused to occur when both of the first search target and the second search target is successfully detected, and thereafter the second event may be caused to occur when the first search target is not detected but only the second search target is successfully detected by bringing the image pick-up apparatus closer to the second search target. By thus generating and displaying a virtual image of the event, more visual effects for having the user actually feel augmented reality in various manners can be provided.

In an exemplary embodiment, the display control instructions are adapted to display a guide at a position corresponding to the first search target detected in accordance with the search target detection instructions.

According to the exemplary embodiment, since the guide is displayed at a position corresponding to the first search target, the user can perform an operation on the search target without confusion and consequently an event can be caused to occur.

In an exemplary embodiment, the display control instructions are adapted to display the guide urging the user to take such an action as varying the number of the first search targets and the second search targets that can be detected in accordance with the search target detection instructions.

According to the exemplary embodiment, since the guide urging the user to take such an action as varying the number of the first search targets and the second search targets is displayed, a hint about causing an event to occur can be given to the user.

In an exemplary embodiment, the event that occurred in accordance with the event occurrence instructions includes arrangement of an object in a prescribed shape in the virtual space, and the virtual image generation instructions are adapted to generate the virtual image by shooting the object in the prescribed shape with the virtual camera.

According to the exemplary embodiment, since an object in a prescribed shape is displayed in accordance with an event, as compared with a case where an object is simply displayed at a position corresponding to the search target, more visual effects for having the user actually feel augmented reality can be provided.

In an exemplary embodiment, the event that occurred in accordance with the event occurrence instructions includes arrangement of a plate-shaped polygon in the virtual space, and the virtual image generation instructions are adapted to generate the virtual image by mapping a texture on the plate-shaped polygon and shooting the polygon with the virtual camera.

According to the exemplary embodiment, since a virtual image obtained by mapping a texture on the plate-shaped polygon arranged in the virtual space is generated, more visual effects for having the user actually feel augmented reality can be provided.

In an exemplary embodiment, the information processing program further includes position calculation instructions for calculating positional relation between the image pick-up apparatus and the search target based on the image of the subject and virtual camera arrangement instructions for arranging the virtual camera in accordance with the positional relation calculated in accordance with the position calculation instructions.

According to the exemplary embodiment, since an image picked up by a virtual camera arranged in accordance with positional relation between the image pick-up apparatus and the search target is generated as the virtual image, such display as if an event occurred in a real world can be provided and hence more visual effects for having the user actually feel augmented reality can be provided.

In an exemplary embodiment, the information processing program further includes first search target position detection instructions for detecting a position of the first search target from the image of the subject, first search target position calculation instructions for calculating positional relation between the image pick-up apparatus and the first search target based on the position detected in accordance with the first search target position detection instructions, and virtual camera arrangement instructions for arranging the virtual camera in accordance with the positional relation calculated in accordance with the first search target position calculation instructions, and the virtual image generation instructions are adapted to generate the virtual image by shooting with the virtual camera, at least the second event that occurs in accordance with the event occurrence instructions.

According to the exemplary embodiment, a virtual image is generated by shooting the second event with the virtual camera arranged in accordance with positional relation calculated in accordance with the first search target position calculation instructions, and therefore more visual effects for having the user actually feel augmented reality can be provided. In addition, since the virtual camera is arranged based on positional relation between the first search target larger than the second search target and the image pick-up apparatus, as compared with a case where the virtual camera is arranged based on positional relation between the second search target and the image pick-up apparatus, shake or flicker of the event displayed as the virtual image is lessened.

An exemplary embodiment provides an information processing apparatus connected to an image pick-up apparatus and a display. The information processing apparatus includes an image obtaining unit, a search target detection unit, an event occurrence unit, a virtual image generation unit, and a display control unit. The image obtaining unit obtains an image of a subject picked up by the image pick-up apparatus. The search target detection unit detects a search target from the image of the subject obtained by the image obtaining unit. The event occurrence unit causes an event to occur in a virtual space in accordance with variation in number of the search targets that can be detected by the search target detection unit. The virtual image generation unit generates a virtual image by shooting the event that occurs by means of the event occurrence unit with a virtual camera arranged in the virtual space. The display control unit causes the display to display the virtual image such that it is visually recognized by a user as superimposed on the image of the subject or on the subject seen through a screen of the display.

According to the exemplary embodiment, since an event is caused to occur in the virtual space in accordance with variation in number of search targets that can be detected, more visual effects for having the user actually feel augmented reality by utilizing the search target can be provided.

An exemplary embodiment provides an information processing method processed by a control unit of an information processing apparatus connected to an image pick-up apparatus and a display. The information processing method includes the steps of obtaining an image of a subject picked up by the image pick-up apparatus, detecting a search target from the obtained image of the subject, causing an event to occur in a virtual space in accordance with variation in number of the search targets that can be detected, generating a virtual image by shooting the event that occurs with a virtual camera arranged in the virtual space, and causing the display to display the virtual image such that it is visually recognized by a user as superimposed on the image of the subject or on the subject seen through a screen of the display.

According to the exemplary embodiment, since an event is caused to occur in the virtual space in accordance with variation in number of search targets that can be detected, more visual effects for having the user actually feel augmented reality by utilizing the search target can be provided.

An exemplary embodiment provides an information processing system. The information processing system includes a search target arranged in a subject, an image pick-up apparatus for picking up an image of the subject, an information processing apparatus connected to the image pick-up apparatus, and a display connected to the information processing apparatus. The information processing apparatus includes an image obtaining unit for obtaining the image of the subject picked up by the image pick-up apparatus, a search target detection unit for detecting the search target from the image of the subject obtained by the image obtaining unit, an event occurrence unit for causing an event to occur in a virtual space in accordance with variation in number of the search targets that can be detected by the search target detection unit, a virtual image generation unit for generating a virtual image by shooting the event that occurs by means of the event occurrence unit with a virtual camera arranged in the virtual space, and a display control unit for causing the display to display the virtual image such that it is visually recognized by a user as superimposed on the image of the subject or on the subject seen through a screen of the display.

According to the exemplary embodiment, since an event is caused to occur in the virtual space in accordance with variation in number of search targets that can be detected, more visual effects for having the user actually feel augmented reality by utilizing the search target can be provided.

The foregoing and other features, aspects and advantages of the present technology will become more apparent from the following detailed description of the present technology when taken in conjunction with the accompanying drawings.

Figure 1:
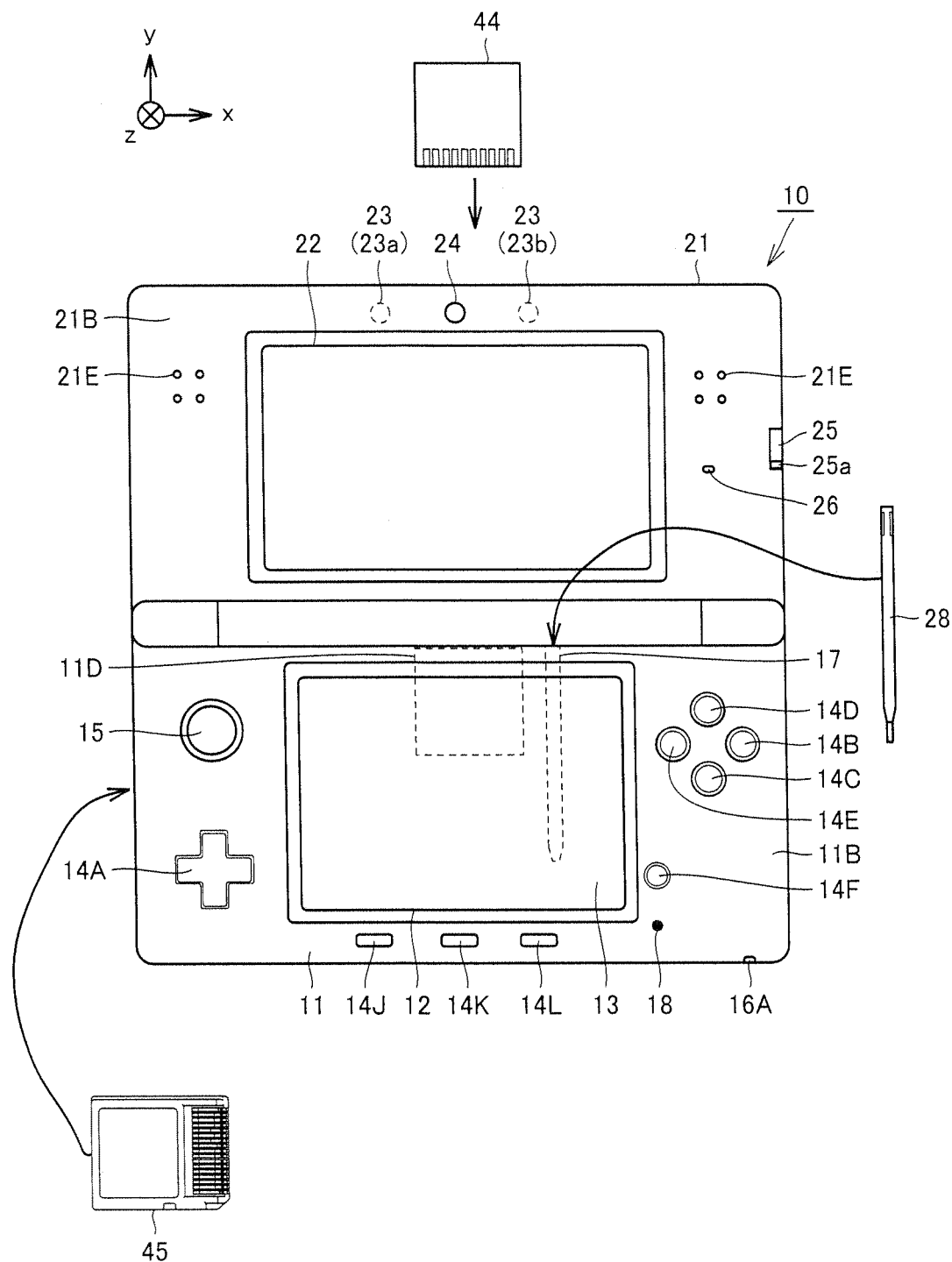
FIG. 1 shows an exemplary illustrative non-limiting front view of an exemplary non-limiting game device in an opened state according to an exemplary embodiment.

DETAILED DESCRIPTION OF NON-LIMITING EXAMPLE EMBODIMENTS (Configuration of Game Device)

A game device according to one embodiment will be described with reference to FIGS. 1 to 5. A game device 10 is a portable game device.

Game device 10 has a lower housing 11 and an upper housing 21. Lower housing 11 and upper housing 21 are connected to each other to allow opening and closing (to be foldable).

(Description of Lower Housing)

Lower housing 11 is provided with a lower LCD (Liquid Crystal Display) 12, a touch panel 13, operation buttons 14A to 14L, an analog stick 15, LEDs 16A to 16B, an insertion port 17, and a microphone hole 18.

Touch panel 13 is attached onto a screen of lower LCD 12. In an upper surface of lower housing 11, insertion port 17 (a dotted line shown in FIGS. 1 and 5) for accommodating a touch pen 28 is provided.

On an inner surface (main surface) of lower housing 11, a cross-shaped button (a direction input button) 14A, a button 14B, a button 14C, a button 14D, a button 14E, a power button 14F, a select button 14J, a HOME button 14K, and a start button 14L are provided.

Analog stick 15 is a device indicating a direction.

In the inner surface of lower housing 11, microphone hole 18 is provided. Under microphone hole 18, a microphone 42 (see FIG. 6) serving as an audio input apparatus is provided.

Figure 2:
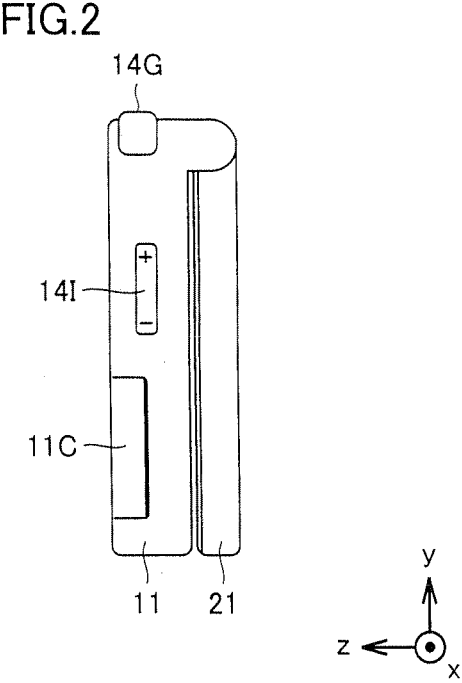
FIG. 2 shows an exemplary illustrative non-limiting left side view of the exemplary non-limiting game device in a closed state according to the exemplary embodiment.
Figure 3:
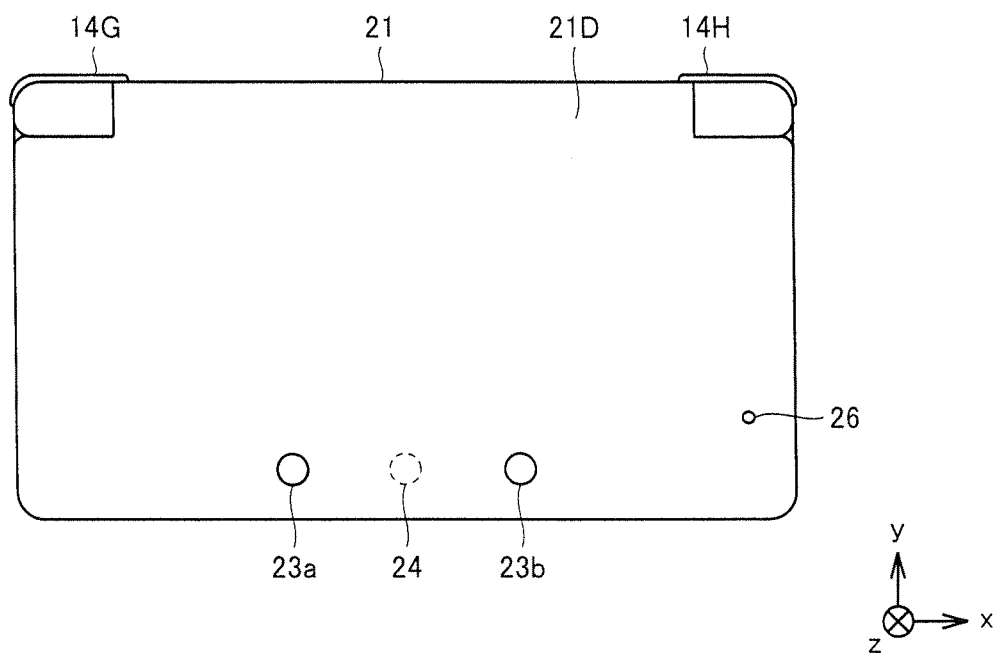
FIG. 3 shows an exemplary illustrative non-limiting top view of the exemplary non-limiting game device in the closed state according to the exemplary embodiment.
Figure 5:
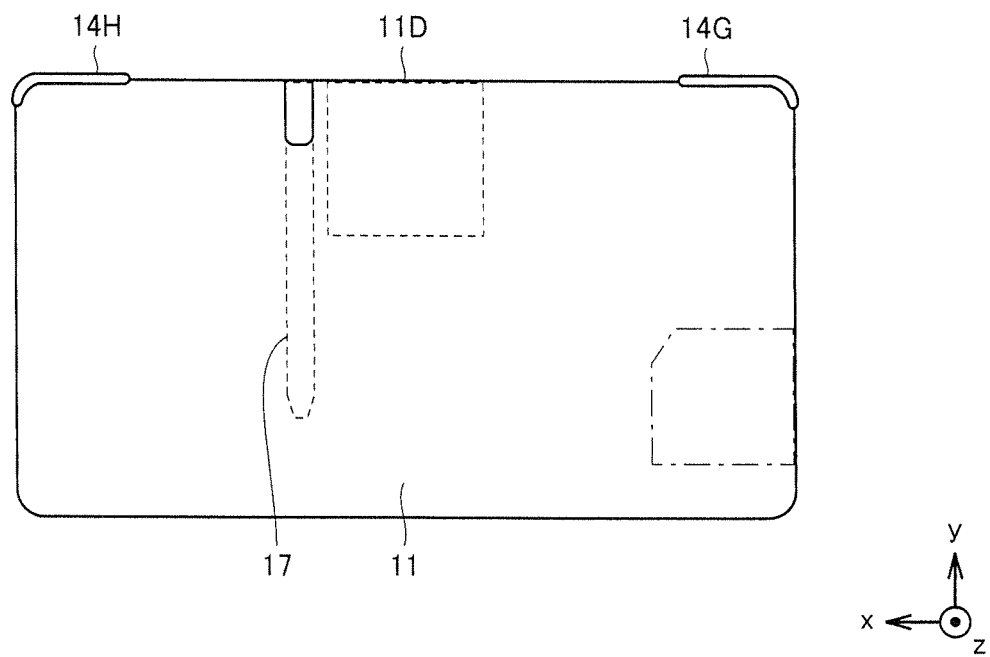
FIG. 5 shows an exemplary illustrative non-limiting bottom view of the exemplary non-limiting game device in the closed state according to the exemplary embodiment.

As shown in FIGS. 3 and 5, an L button 14G and an R button 14H are provided on the upper surface of lower housing 11. In addition, as shown in FIG. 2, on a left side surface of lower housing 11, a sound volume button 14I for adjusting volume of a speaker 43 (see FIG. 6) included in game device 10 is provided.

As shown in FIG. 2, a cover portion 11C that can be opened and closed is provided on the left side surface of lower housing 11. In the inside of this cover portion 11C, a connector for electrically connecting game device 10 and an external memory for data saving 45 to each other is provided.

As shown in FIG. 5, an insertion port 11D for inserting an external memory 44 is provided in the upper surface of lower housing 11.

Figure 4:
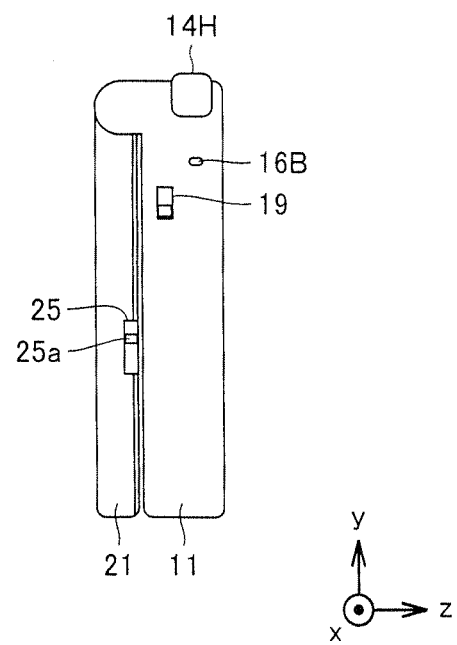
FIG. 4 shows an exemplary illustrative non-limiting right side view of the exemplary non-limiting game device in the closed state according to the exemplary embodiment.

As shown in FIGS. 1 and 4, a first LED 16A for notifying a user of a power ON/OFF state of game device 10 is provided on a lower surface of lower housing 11 and a second LED 16B for notifying the user of a state of establishment of wireless communication of game device 10 is provided on a right side surface of lower housing 11. Game device 10 is capable of establishing wireless communication with other equipment and a wireless switch 19 for activating/inactivating this wireless communication function is provided on the right side surface of lower housing 11 (see FIG. 4).

(Description of Upper Housing)

As shown in FIGS. 1 and 2, upper housing 21 is provided with an upper LCD 22, an outer image pick-up portion 23 (an outer image pick-up portion (left) 23a and an outer image pick-up portion (right) 23b), an inner image pick-up portion 24, a 3D adjustment switch 25, and a 3D indicator 26.

Upper LCD 22 is a display capable of displaying an image that can stereoscopically be viewed. Specifically, upper LCD 22 is a parallax barrier type display allowing stereoscopic vision with naked eyes. Upper LCD 22 can display an image with stereoscopic effect as felt by a user (a stereoscopic image (3D image)) by having the users left eye visually recognize an image for left eye and the user's right eye visually recognize an image for right eye by using a parallax barrier. In addition, upper LCD 22 can inactivate the parallax barrier above, and when the parallax barrier is inactivated, an image can two-dimensionally be displayed. Thus, upper LCD 22 is a display capable of switching between a stereoscopic display mode for displaying a stereoscopic image and a two-dimensional display mode for two-dimensionally displaying an image (displaying a two-dimensional image). Switching between the display modes is made, for example, by 3D adjustment switch 25 which will be described later.

Outer image pick-up portion 23 is a generic name of two image pick-up portions (23a and 23b) provided on an outer surface 21D of upper housing 21. Outer image pick-up portion (left) 23a and outer image pick-up portion (right) 23b can be used as stereo cameras by a program executed by game device 10.

Inner image pick-up portion 24 is an image pick-up portion provided on an inner surface 21B of upper housing 21 and having an inward direction of normal to the inner surface as a direction of image pick-up.

Three-D adjustment switch 25 is a slide switch and it is a switch used for switching between the display modes of upper LCD 22 as described above. In addition, 3D adjustment switch 25 is used for adjusting stereoscopic effect of an image that is displayed on upper LCD 22 and can stereoscopically be viewed (a stereoscopic image). A slider 25*a* of 3D adjustment switch 25 can be slid to any position in a prescribed direction (a vertical direction) and a display mode of upper LCD 22 is set in accordance with a position of slider 25*a*. Further, how a stereoscopic image is viewed is adjusted in accordance with a position of slider 25*a*.

Three-D indicator 26 is an LED indicating whether upper LCD 22 is in a stereoscopic display mode or not.

Further, a speaker hole 21E is provided in the inner surface of upper housing 21. Voice and sound from speaker 43 which will be described later is output from this speaker hole 21E.

(Internal Configuration of Game Device 10)

Figure 6:
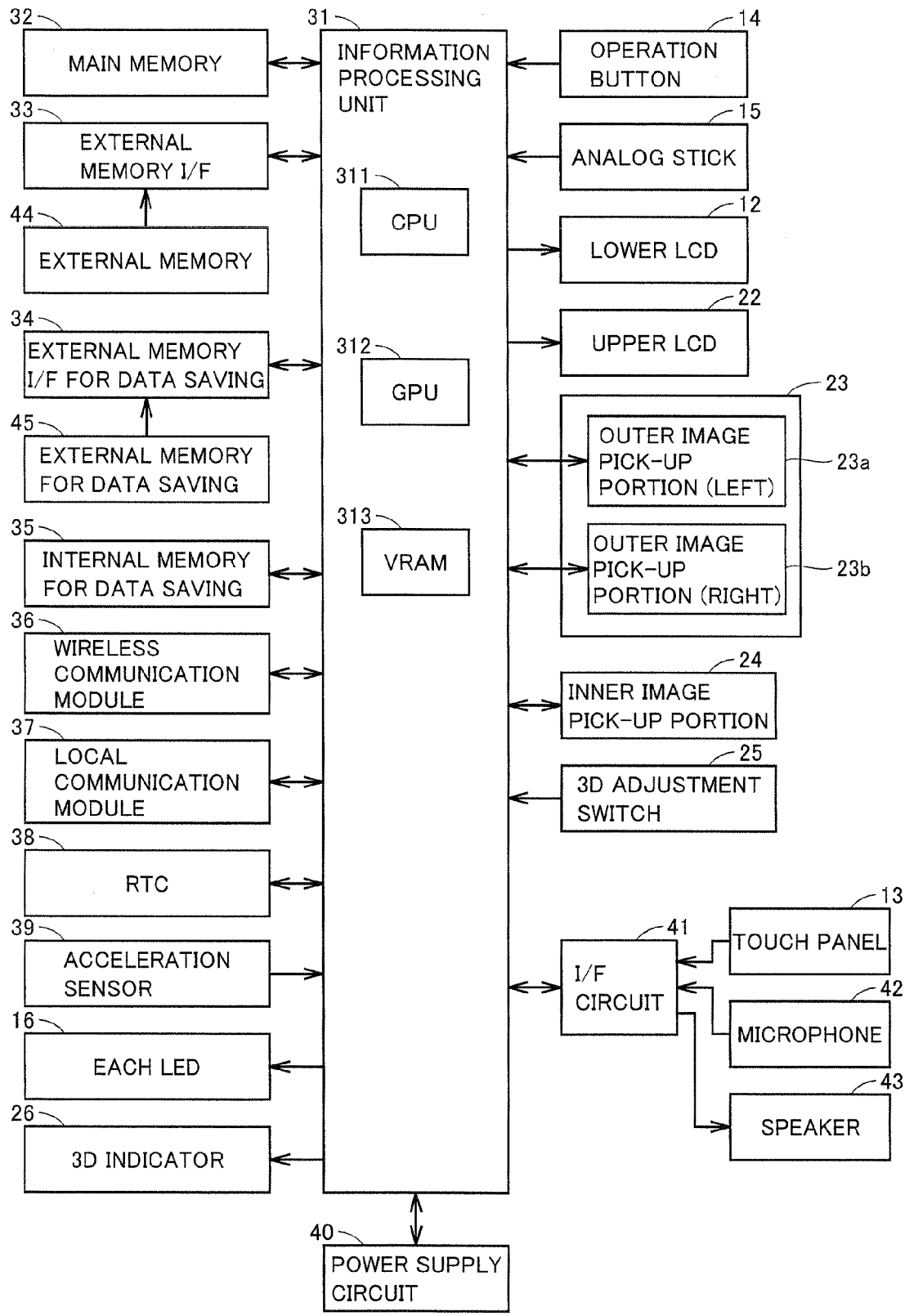
FIG. 6 shows an exemplary illustrative non-limiting block diagram showing an internal structure of the exemplary non-limiting game device according to the exemplary embodiment.

An internal electrical configuration of game device 10 will be described with reference to FIG. 6. As shown in FIG. 6, game device 10 includes, in addition to each portion described above, such electronic components as an information processing unit 31, a main memory 32, an external memory interface (external memory I/F) 33, an external memory I/F for data saving 34, an internal memory for data saving 35, a wireless communication module 36, a local communication module 37, a real time clock (RTC) 38, an acceleration sensor 39, a power supply circuit 40, and an interface circuit (I/F circuit) 41.

Information processing unit 31 includes a CPU (Central Processing Unit) 311 for executing a prescribed program, a GPU (Graphics Processing Unit) 312 for performing image processing, and a VRAM (Video RAM) 313. CPU 311 performs processing in accordance with a program by executing the program stored in a memory in game device 10 (such as external memory 44 connected to external memory I/F 33 or internal memory for data saving 35). It is noted that a program executed by CPU 311 may be obtained from other equipment through communication with other equipment. GPU 312 generates an image in response to an instruction from CPU 311 and renders the image in VRAM 313. The image rendered in VRAM 313 is output to upper LCD 22 and/or lower LCD 12 so that the image is displayed on upper LCD 22 and/or lower LCD 12.

External memory I/F 33 is an interface for removably connecting external memory 44. In addition, external memory I/F for data saving 34 is an interface for removably connecting external memory for data saving 45.

Main memory 32 is a volatile storage device used as a work area or a buffer area of (CPU 311 of) information processing unit 31.

External memory 44 is a non-volatile storage device for storing a program and the like executed by information processing unit 31. External memory 44 is implemented, for example, by a read-only semiconductor memory.

External memory for data saving 45 is implemented by a non-volatile readable and writable memory (such as a NAND type flash memory) and used for saving any data.

Internal memory for data saving 35 is implemented by a non-volatile readable and writable memory (such as a NAND type flash memory) and used for storing prescribed data. For example, internal memory for data saving 35 stores data or a program downloaded through wireless communication via wireless communication module 36.

Wireless communication module 36 has a function to establish connection to wireless LAN under a scheme complying, for example, with IEEE802.11b/g standard, Local communication module 37 has a function to establish wireless communication with a game device of the same type under a prescribed communication scheme (such as communication under an original protocol or infrared communication).

Acceleration sensor 39 detects magnitude of acceleration in a direction of a straight line (linear acceleration) along each direction of three axes (xyz axes). Information processing unit 31 can detect an orientation or motion of game device 10 as it receives data indicating acceleration (acceleration data) detected by acceleration sensor 39.

RTC 38 counts time and outputs the time to information processing unit 31. Information processing unit 31 calculates the current time (date) based on the time counted by RTC 38, Power supply circuit 40 controls electric power from a power supply (a chargeable battery) included in game device 10 and causes supply of electric power to each component in game device 10.

Touch panel 13, microphone 42 and speaker 43 are connected to I/F circuit 41. I/F circuit 41 includes an audio control circuit for controlling microphone 42 and speaker 43 (an amplifier) and a touch panel control circuit for controlling the touch panel. The audio control circuit carries out A/D conversion and D/A conversion of an audio signal and conversion of an audio signal to audio data in a prescribed format. The touch panel control circuit generates touch position data in a prescribed format based on a signal from touch panel 13 and outputs the touch position data to information processing unit 31. As information processing unit 31 obtains the touch position data, it can know a position where input onto touch panel 13 has been made.

Operation button 14 consists of operation buttons 14A to 14L above and operation data indicating a status of input to operation buttons 14A to 14I (whether an operation button has been pressed or not) is output from operation button 14 to information processing unit 31.

Lower LCD 12 and upper LCD 22 are connected to information processing unit 31. Specifically, information processing unit 31 is connected an LCD controller (not shown) of upper LCD 22 and controls the LCD controller to turn ON/OFF the parallax barrier. When the parallax barrier of upper LCD 22 is turned ON, an image for right eye and an image for left eye stored in VRAM 313 of information processing unit 31 are output to upper LCD 22. More specifically, the LCD controller reads the image for right eye and the image for left eye from VRAM 313 by alternately repeating processing for reading pixel data for one line in a vertical direction with regard to the image for right eye and processing for reading pixel data for one line in the vertical direction with regard to the image for left eye. Thus, the image for right eye and the image for left eye are each divided into strip-like images in which pixels are aligned vertically for each one line, and an image in which strip-like images of the image for right eye and strip-like images of the image for left eye as divided are alternately arranged is displayed on a screen of upper LCD 22. Then, as the image is visually recognized by the user through the parallax barrier of upper LCD 22, the user's right and left eyes visually recognize the image for right eye and the image for left eye respectively. As described above, an image that can stereoscopically be viewed is displayed on the screen of upper LCD 22.

Outer image pick-up portion 23 and inner image pick-up portion 24 pick up an image in response to an instruction from information processing unit 31 and output data of the picked-up image to information processing unit 31.

Three-D adjustment switch 25 transmits an electric signal in accordance with a position of slider 25*a* to information processing unit 31.

Information processing unit 31 controls illumination of 3D indicator 26. For example, when upper LCD 22 is in a stereoscopic display mode, information processing unit 31 causes 3D indicator 26 to illuminate.

(Outlines of Game)

Outlines of a game performed in game device 10 will be described with reference to FIGS. 7 to 12. This game is a game making use of an augmented reality technique and played while an image of a marker 50 (an outer marker 50*a*, an inner marker 50*b*) in a prescribed design (a character, a number, a symbol, other designs) drawn in a note coming together with game software is picked up by outer image pick-up portion 23 of game device 10.

Figure 7:
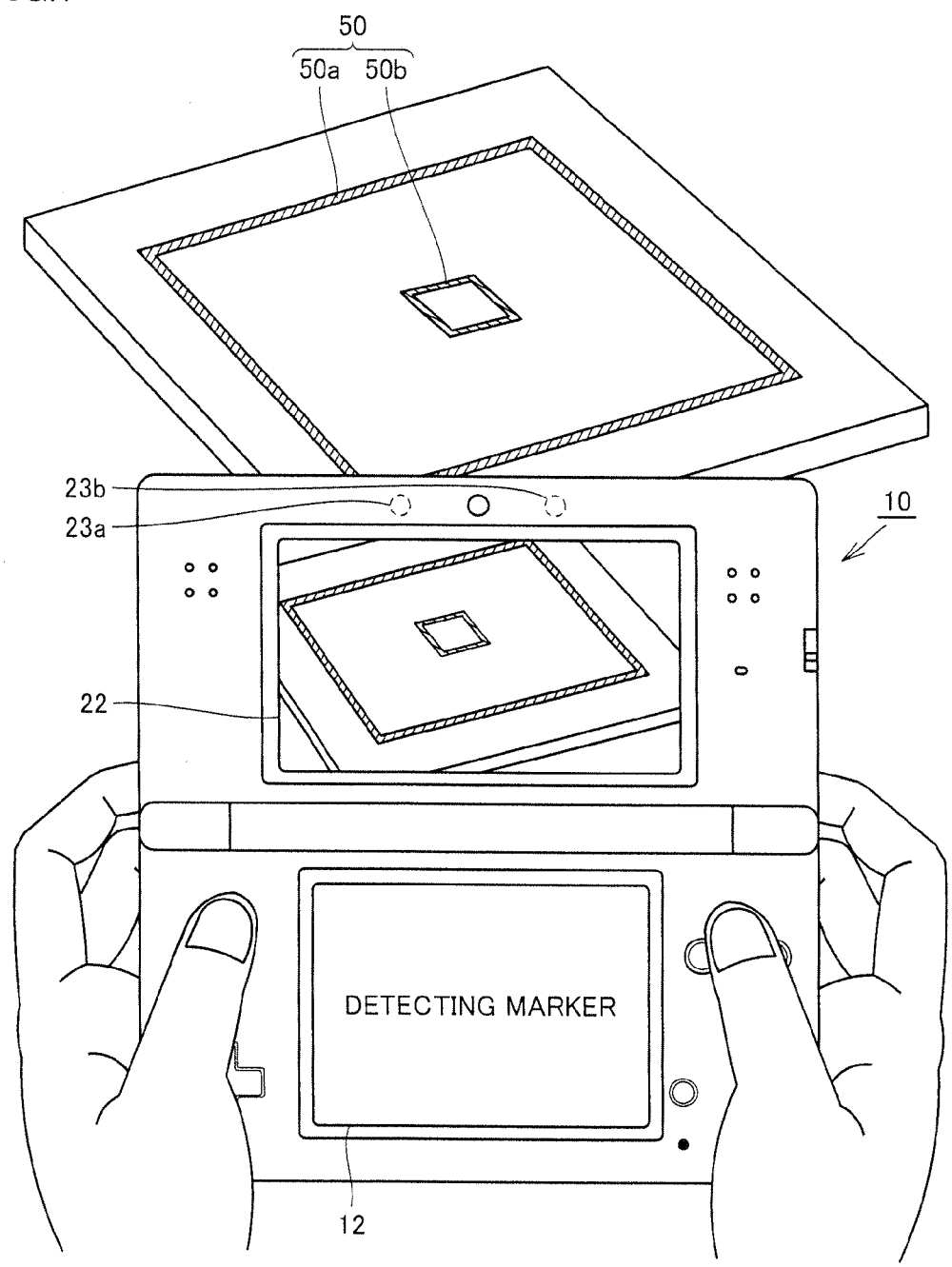
FIGS. 7 to 12 each show an exemplary illustrative non-limiting game image of the exemplary non-limiting game device according to the exemplary embodiment while a game is being played.

A game image example shown in FIG. 7 shows a game image displayed on upper LCD 22 and lower LCD 12 when marker 50 is detected immediately after the game is started.

On upper LCD 22, an image of a note (a subject) currently picked up by outer image pick-up portion 23 and an image of marker 50 drawn in the note are displayed. In this example, marker 50 has outer marker 50*a* (a first search target) and inner marker 50*b* arranged as encompassed in outer marker 50*a* (a second search target).

On lower LCD 12, information indicating that marker 50 is being detected (for example, "detecting marker") is displayed. When game device 10 failed to detect marker 50, game device 10 may display such information as "Marker has not been detected. Please perform again processing for detecting marker." on lower LCD 12. When game device 10 detects marker 50, game device 10 may display such information as "Marker has been detected." on lower LCD 12.

Figure 8:
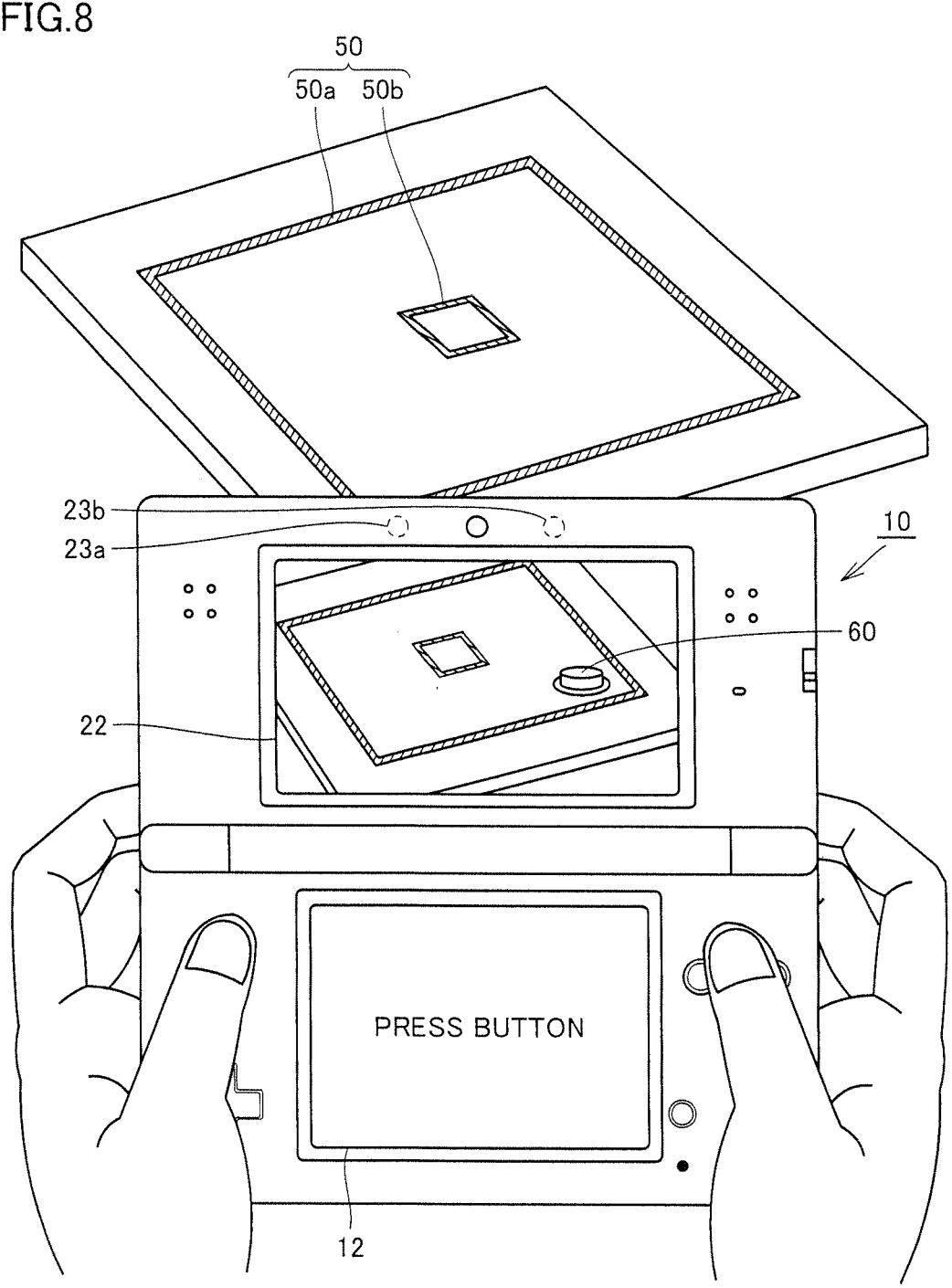

When two markers of outer marker 50*a* and inner marker 50*b* is successfully detected, game device 10 causes a first event to occur. As a result of the first event that occurred, game device 10 reproduces a motion picture in a region within outer marker 50*a* of upper LCD 22 and thereafter displays a button object 60 arranged within outer marker 50*a* as shown in FIG. 8.

Button object 60 displayed on upper LCD 22 is a guide for having the user make transition to a second event and it is displayed at a position corresponding to outer marker 50*a*. It is noted that there is also a case where, simply by displaying button object 60, the user cannot understand an action that he/she should take next, and therefore game device 10 may display such information as "Press button." on lower LCD 12 in order to urge the user to take action. Namely, by displaying a guide urging the user to take such an action as varying the number of markers, a hint about causing an event to occur can be given to the user.

Figure 9:
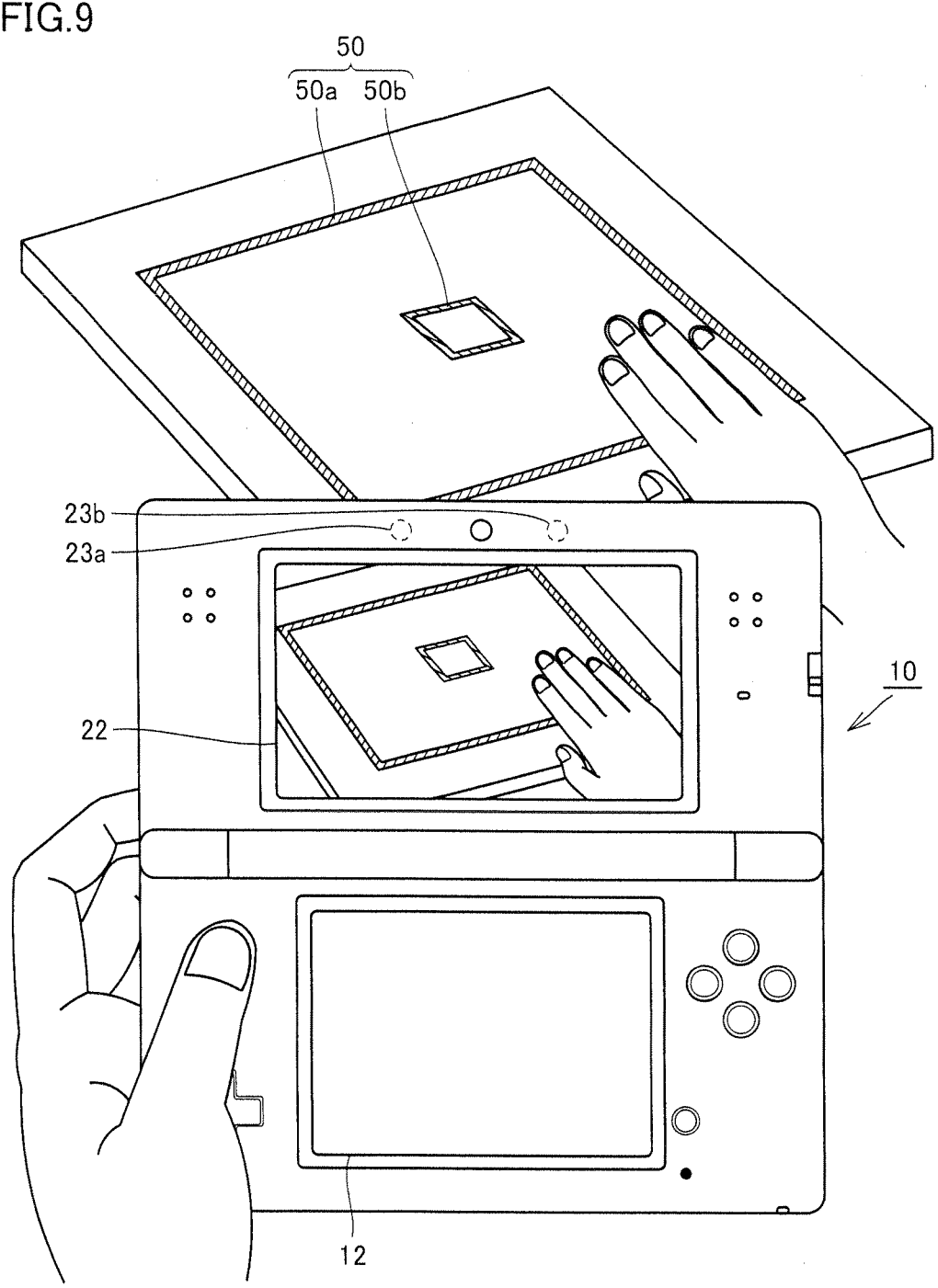

Then, when the user presses button object 60 displayed on upper LCD 22 as shown in FIG. 9, game device 10 cannot detect outer marker 50*a* because a part of outer marker 50*a* is hidden by a user's hand. It is noted that game device 10 makes determination as to whether marker 50 can be detected or not in the following detection processing.

Game device 10 detects a series of edge pixels from an image of marker 50 through edge detection processing and obtains straight lines of four sides based on the series of edge pixels. Here, four vertices are calculated by detecting an intersection of two adjacent straight lines of four straight lines. By thus calculating four vertices, four vertices can be obtained, for example, even when a part of an outer frame of outer marker 50*a* is hidden by a hand.

Then, game device 10 extracts an image of the inside of outer marker 50*a* (a region surrounded by the four vertices above), calculates similarity by comparing data of the extracted image with pattern data stored in advance in a game program, and determines that outer marker 50*a* in accordance with the pattern data has been detected when the calculated similarity is not smaller than a prescribed value.

Then, positional relation between outer image pick-up portion 23 and outer marker 50*a* in a real space is calculated from the four vertices, and a position and an orientation of the virtual camera in the virtual space are calculated based on this result of calculation. The virtual camera is installed such that positional relation between outer image pick-up portion 23 and outer marker 50*a* in the real space and positional relation between the virtual camera and the marker in the virtual space correspond to each other.

Game device 10 extracts such an image of the inside of outer marker 50*a* of which part is hidden by a user's hand, calculates similarity by comparing data of the extracted image with the pattern data stored in advance in the game program, and determines that outer marker 50*a* cannot be detected when it is determined that the calculated similarity is smaller than the prescribed value.

It is noted that, even though game device 10 determines that outer marker 50*a* cannot be detected, it can obtain four vertices of outer marker 50*a*. Therefore, even in a case where only inner marker 50*b* has been detected in processing of the second event, if setting of the virtual camera is based on the four vertices of outer marker 50*a*, positions of respective four vertices are stabilized as compared with a case where the virtual camera is set based on four vertices of inner marker 50*b* and flicker of a displayed virtual object can be lessened.

In addition, determination by game device 10 as to whether marker 50 can be detected or not is not limited to the method described previously, and for example, a method of making determination based on whether all sides of marker 50 can be recognized or not may be applicable. For example, if a part of outer marker 50*a* is hidden by a user's hand and one of the four sides of outer marker 50*a* cannot be recognized, game device 10 determines that outer marker 50*a* cannot be detected.

When game device 10 can no longer detect outer marker 50*a* because the user presses button object 60 and a part of outer marker 50*a* is hidden by a user's hand, the number of markers 50 that can be detected varies. Namely, when the user presses button object 60 in a state where game device 10 is being able to detect two markers of outer marker 50*a* and inner marker 50*b*, game device 10 will no longer be able to detect outer marker 50*a* and to detect only inner marker 50*b*.

Figure 10:
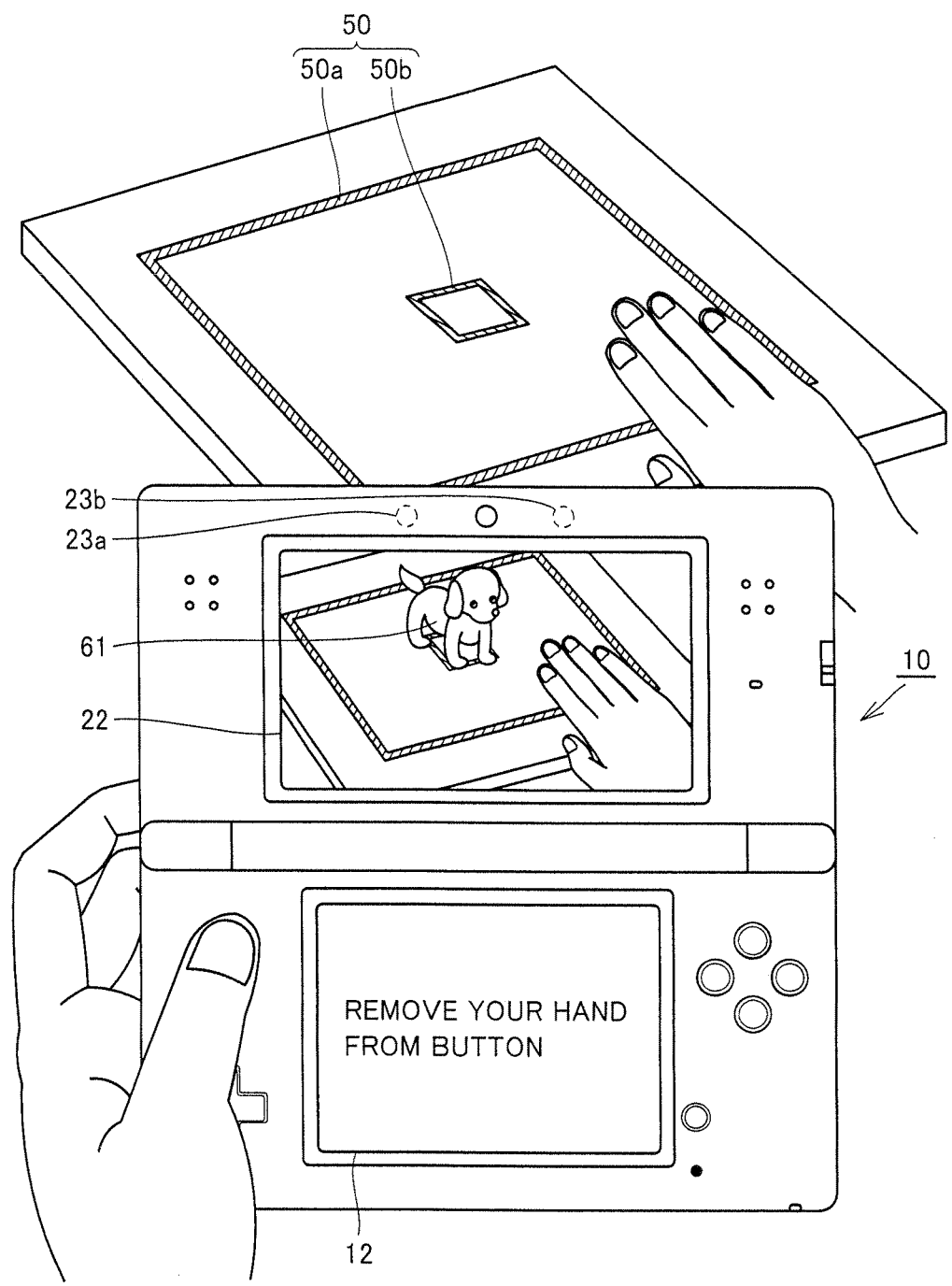

When the number of markers 50 that can be detected varies after processing of the first event ends, game device 10 causes the second event to occur. As the second event occurs, on upper LCD 22, a character object 61 is displayed within inner marker 50*b* as shown in FIG. 10. It is noted that game device 10 may display such information as "Remove your hand from button." on lower LCD 12 in order to have the user make transition to a third event.

Figure 11:
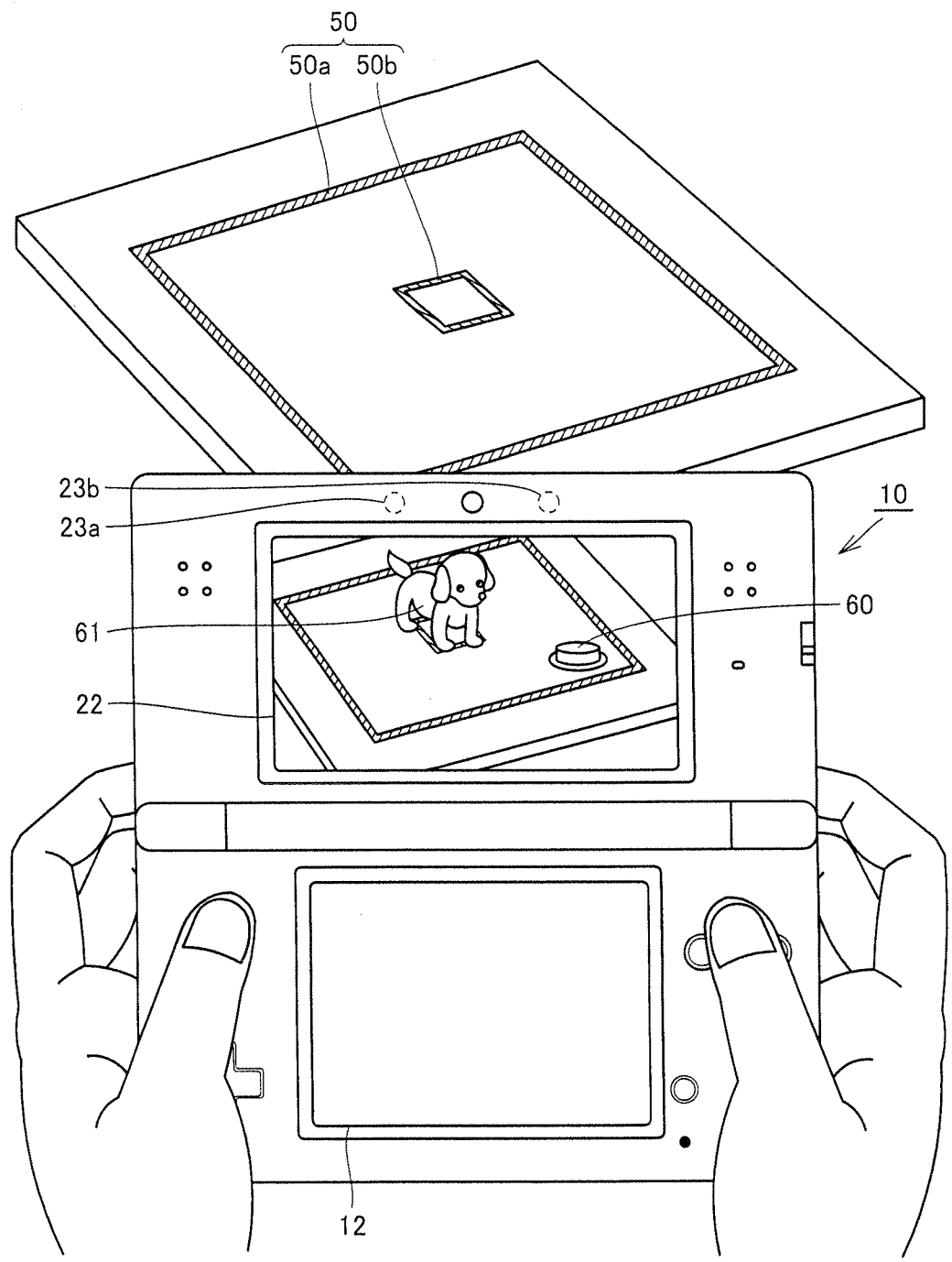

Then, when the user removes his/her hand from button object 60 displayed on upper LCD 22 as shown in FIG. 11, game device 10 can again recognize a part of outer marker 50*a* that has been hidden by the user's hand and hence it can detect outer marker 50*a*.

As the user removes his/her hand from button object 60, game device 10 can again recognize a part of outer marker 50*a* that has been hidden by the user's hand and can detect outer marker 50*a*, and thus the number of markers 50 that can be detected varies. Namely, when the user removes his/her hand from button object 60 while game device 10 is being able to detect a marker, i.e., only inner marker 50*b*, it will again be able to detect outer marker 50*a* and enter a state where it can detect two markers of outer marker 50*a* and inner marker 50*b*.

Figure 12:
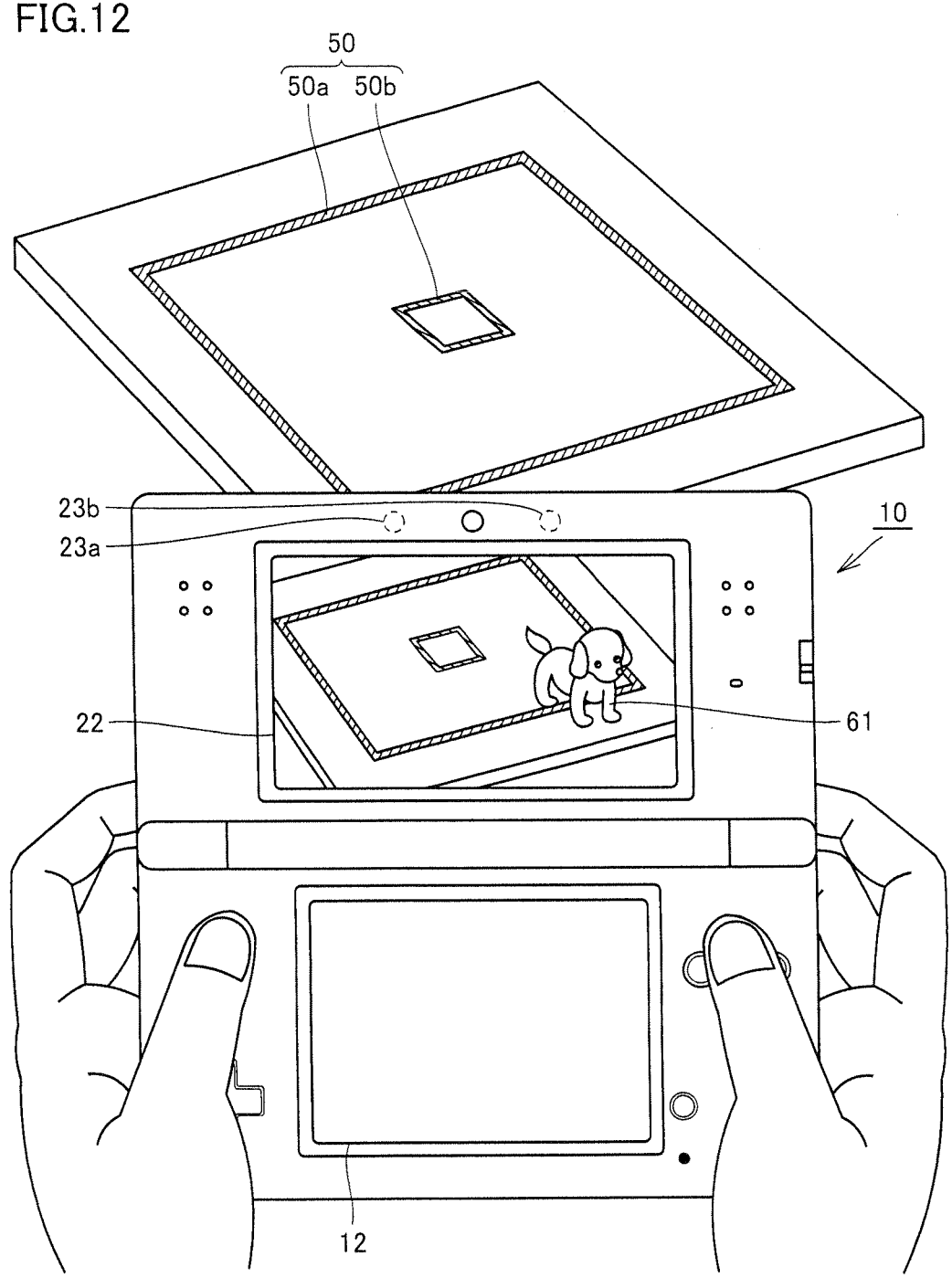

When the number of markers 50 that can be detected varies after processing of the second event ends, game device 10 causes the third event to occur. As a result of the third event that occurred, on upper LCD 22, a situation in which character object 61 moves in a direction of the user's removed hand is displayed as shown in FIG. 12.

(Operation of Game Device 10)

An operation of game device 10 will now be described in further detail with reference to FIGS. 13 to 17.

Figure 13:
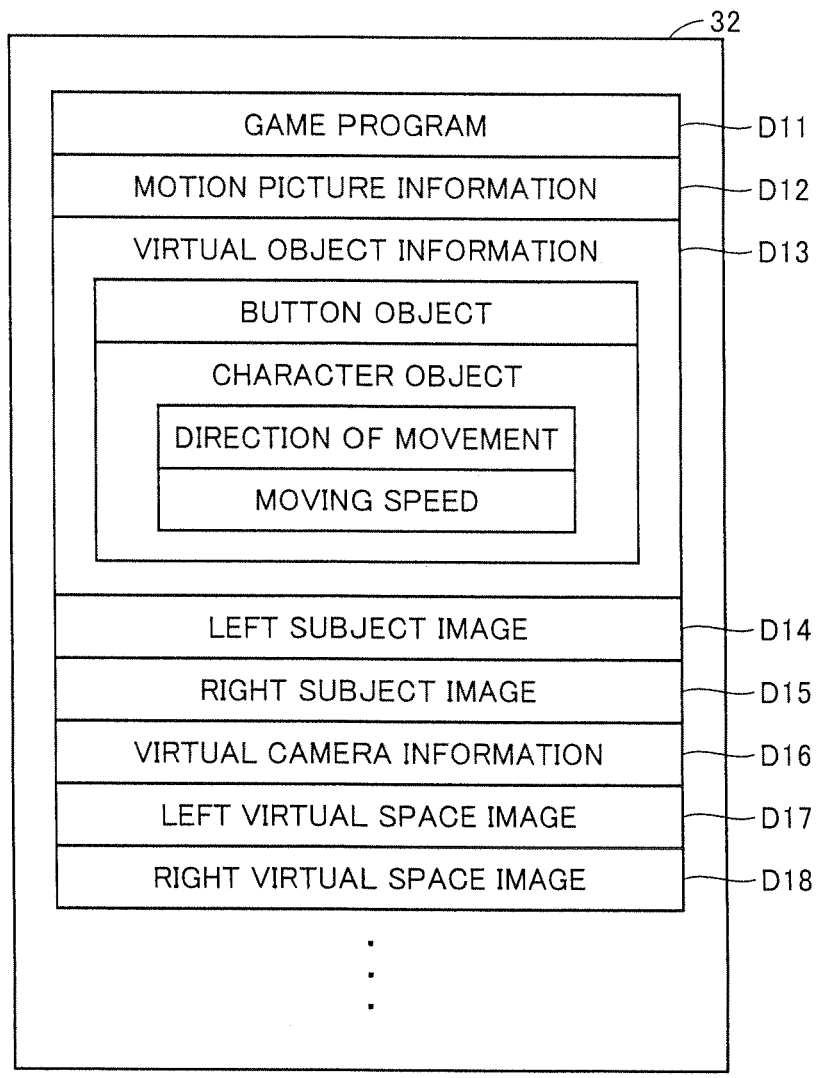
FIG. 13 shows an exemplary illustrative non-limiting schematic diagram showing a memory map of the exemplary non-limiting game device according to the exemplary embodiment.

Main memory 32 shown in FIG. 13 includes a game program D11, motion picture information D12, virtual object information D13, a left subject image D14, a right subject image D15, virtual camera information D16, a left virtual space image D17, a right virtual space image D18, and the like.

Game program D11 is read from external memory 44, internal memory for data saving 35 or the like and stored in main memory 32 prior to play of the game. It is noted that game program D11 may be received from a server apparatus or another game device by using a wireless communication function and stored in main memory 32.

Motion picture information D12 is motion picture information displayed in the first event or the like, and it is motion picture information compressed based on such motion picture compression standards as H.264, MPEG-4 AVC, or the like.

Virtual object information D13 is information relating to various virtual objects (button object 60 and character object 61) arranged in the virtual space and it includes such information as a shape, a color, a design, a position, and an orientation of a virtual object. Regarding character object 61, information on a direction of movement and a moving speed is also included.

Left subject image D14 is an image of a subject picked up by outer image pick-up portion (left) 23*a* and right subject image D15 is an image of a subject picked up by outer image pick-up portion (right) 23*b*.

Virtual camera information D16 is information on a pair of virtual cameras (a left virtual camera and a right virtual camera which will be described later) used in generating a stereoscopic image, and it includes such information as a position or an orientation of each virtual camera in the virtual space.

Left virtual space image D17 is a virtual image rendered based on the left virtual camera and right virtual space image D18 is a virtual image rendered based on the right virtual camera.

Figure 14:
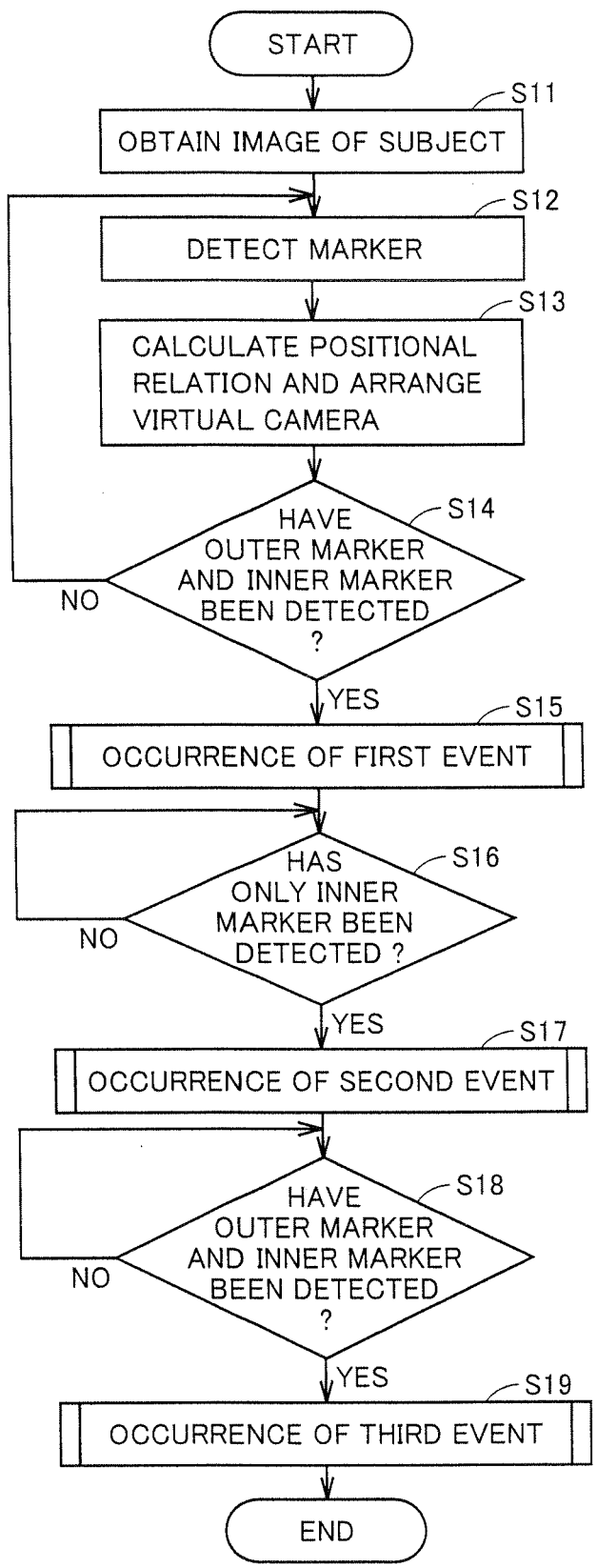
FIG. 14 shows an exemplary illustrative non-limiting flowchart for illustrating an operation of the exemplary non-limiting game device according to the exemplary embodiment.

Flow of game processing performed by CPU 311 based on game program D11 will be described with reference to FIG. 14. The game processing is started, for example, when button 14B of operation button 14 is pressed while an image of a subject is picked up by outer image pick-up portion 23.

Initially, CPU 311 obtains most recent left subject image D14 and right subject image D15 from outer image pick-up portion (left) 23*a* and outer image pick-up portion (right) 23*b* and causes main memory 32 to store the images (step S11).

Then, CPU 311 detects marker 50 from the obtained image of the subject (step S12). In the marker detection processing, marker 50 in each of left subject image D14 and right subject image D15 is detected. For example, left subject image D14 and right subject image D15 are each subjected to edge detection processing and pattern matching processing, so as to detect marker 50 in each of left subject image D14 and right subject image D15. Here, in the edge detection processing, a series of edge pixels representing a contour of marker 50 is detected from left subject image D14 and right subject image D15 and a plurality of straight lines are generated based on the series of edge pixels, to thereby detect vertices of the contour.

Then, CPU 311 calculates positional relation between outer image pick-up portion 23 and marker 50 in the real space based on four vertices of marker 50 and calculates a position and an orientation of the virtual camera in the virtual space based on this result of calculation, and the virtual camera is installed such that positional relation between outer image pick-up portion 23 and outer marker 50*a* in the real space and positional relation between the virtual camera and the marker in the virtual space correspond to each other (step S13). Processing for calculating a position of the virtual camera based on the positional relation above may be similar to that in a conventional augmented reality feeling technique. It is noted that processing for calculating a position and an orientation of the virtual camera in the virtual space and installing the virtual camera is performed at a certain interval and it is performed also during processing of each event which will be described later. In a subsequent flowchart, however, the processing is assumed as being performed at a certain interval including during processing of each event which will be described later, although the description may not be provided. In addition, here, similar processing may be performed also for marker 50*b*, a virtual camera separate from the virtual camera above may be arranged in the virtual space such that positional relation between outer image pick-up portion 23 and inner marker 50*b* in the real space and positional relation between the virtual camera and marker 50*b* in the virtual space correspond to each other, and thus the virtual camera may be used in step S172 which will be described later.

As shown in FIG. 7, marker 50 has outer marker 50*a* and inner marker 50*b* arranged as encompassed in outer marker 50*a*. It is noted that marker 50 is not limited to a case having outer marker 50*a* and inner marker 50*b*, and a case where a plurality of inner markers 50*b* are encompassed in outer marker 50*a*, a case where a marker is further encompassed in inner marker 50*b*, and the like may be applicable.

In a case where marker 50 has outer marker 50*a* and inner marker 50*b*, CPU 311 detects outer marker 50*a* by performing edge detection processing and pattern matching processing, and thereafter detects inner marker 50*b* by again performing edge detection processing and pattern matching processing. It is noted that CPU 311 may detect outer marker 50*a* and inner marker 50*b* together by once performing edge detection processing and pattern matching processing.

Then, CPU 311 determines whether it has detected two markers of outer marker 50*a* and inner marker 50*b* or not (step S14). When CPU 311 determines that it failed to detect two markers 50 of outer marker 50*a* and inner marker 50*b* (step S14: NO), the process returns to step S12 and processing for detecting marker 50 from the obtained image of the subject is continued. When CPU 311 determines that it has detected two markers of outer marker 50*a* and inner marker 50*b* (step S14: YES), CPU 311 causes the first event to occur (step S15).

Figure 15:
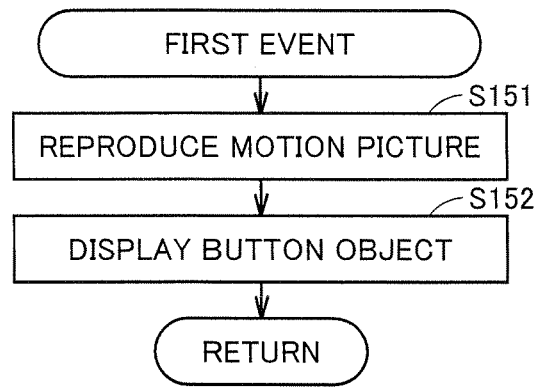
FIG. 15 shows an exemplary illustrative non-limiting flowchart for illustrating processing of a first event shown in FIG. 14.

Processing of the first event that occurred will now be described with reference to FIG. 15. Initially, CPU 311 reads motion picture information D12 from main memory 32 and reproduces the motion picture in a region within outer marker 50*a* (step S151). Specifically, a method of reproducing the motion picture in the region within outer marker 50*a* will be described. CPU 311 arranges a plate-shaped polygon in the virtual space in response to the first event that occurred. CPU 311 generates a virtual image by mapping an image of motion picture information D12 as a texture on the arranged plate-shaped polygon and then shooting the image with the virtual camera. CPU 311 reproduces the motion picture by successively displaying the virtual images on upper LCD 22 such that the generated virtual images as superimposed on the image of the subject are visually recognized by the user.

After the motion picture is reproduced, CPU 311 reads button object 60 from virtual object information D13 in main memory 32 and arranges read button object 60. Thereafter, CPU 311 generates a virtual image within the virtual space by picking up an image of the virtual space including button object 60 with the virtual camera, synthesizes the image of the subject with the virtual image, and displays the resultant image on upper LCD 22 (step S152).

The processing of the first event ends when button object 60 is displayed on upper LCD 22. CPU 311 urges the user of an operation to press button object 60 by displaying button object 60 on upper LCD 22. It is noted that CPU 311 is assumed to continually perform processing for detecting marker 50 after processing of the first event ended. Therefore, as the user presses button object 60, a part of outer marker 50*a* is hidden by a user's hand and outer marker 50*a* can no longer be detected. Namely, CPU 311 can determine whether the user has pressed button object 60 or not by determining whether it has detected only inner marker 50*b* or not.

Referring back to FIG. 14, CPU 311 determines whether it has detected only inner marker 50*b* or not (step S16). When CPU 311 determines that it failed to detect only inner marker 50*b* (when CPU 311 determines that it has detected two markers of outer marker 50*a* and inner marker 50*b* and/or CPU 311 determines that it has detected neither of outer marker 50*a* and inner marker 50*b*) (step S16: NO), CPU 311 continues processing for detecting marker 50. When CPU 311 determines that it has detected only inner marker 50*b* (step S16: YES), it causes the second event to occur (step S17).

Figure 16:
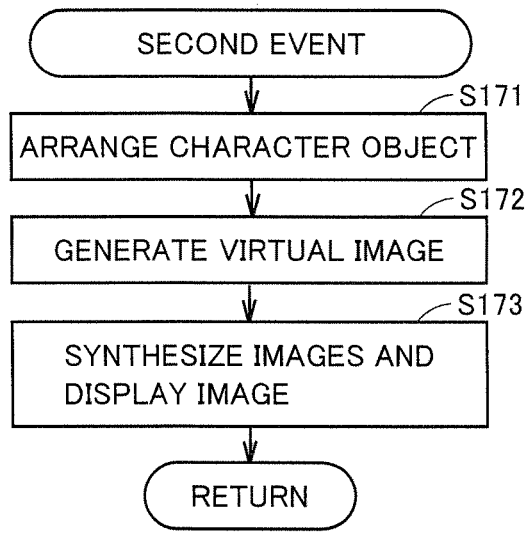
FIG. 16 shows an exemplary illustrative non-limiting flowchart for illustrating processing of a second event shown in FIG. 14.

Processing of the second event that occurred will now be described with reference to FIG. 16. Initially, CPU 311 arranges character object 61 at a prescribed position with the origin in the virtual space serving as the reference, the origin being the center of outer marker 50*a* (step S171).

After CPU 311 arranged character object 61, CPU 311 generates a virtual image in the virtual space by picking up an image of the virtual space including character object 61 with the virtual camera (step S172). Specifically, CPU 311 generates left virtual space image D17 by rendering a virtual object (such as character object 61) based on the left virtual camera and generates right virtual space image D18 by rendering a virtual object based on the right virtual camera. It is noted that processing for rendering the virtual space is typically performed by GPU 312 in response to an instruction from CPU 311.

After CPU 311 generates a virtual image, CPU 311 synthesizes the image of the subject with the virtual image and causes upper LCD 22 to display the resultant image (step S173). Specifically, CPU 311 overwrites left subject image D14 with left virtual space image D17 (that is, character object 61 rendered based on the left virtual camera) and overwrites right subject image D15 with right virtual space image D18 (that is, character object 61 rendered based on the right virtual camera). Then the synthesized image is displayed on upper LCD 22. Namely, CPU 311 causes upper LCD 22 to display a 3D image, with the synthesized image of left subject image D14 and left virtual space image D17 serving as an image for left eye and the synthesized image of right subject image D15 and right virtual space image D18 serving as an image for right eye.

The processing of the second event ends when character object 61 is displayed on upper LCD 22. It is noted that CPU 311 is assumed to continually perform processing for detecting marker 50 after processing of the second event ended.

Therefore, as the user removes his/her hand from button object 60, a part of outer marker 50*a* that has been hidden by a user's hand is again recognized and outer marker 50*a* can again be detected. Namely, CPU 311 can determine whether the user has removed his/her hand from button object 60 or not by determining whether it has detected two markers of outer marker 50*a* and inner marker 50*b* or not.

Referring back to FIG. 14, CPU 311 detects whether it has detected two markers of outer marker 50*a* and inner marker 50*b* or not (step S18). When CPU 311 determines that it failed to detect two markers of outer marker 50*a* and inner marker 50*b* (step S18: NO), CPU 311 continues processing for detecting marker 50. When CPU 311 determines that it has detected two markers of outer marker 50*a* and inner marker 50*b* (step S18: YES), CPU 311 causes the third event to occur (step S19).

Figure 17:
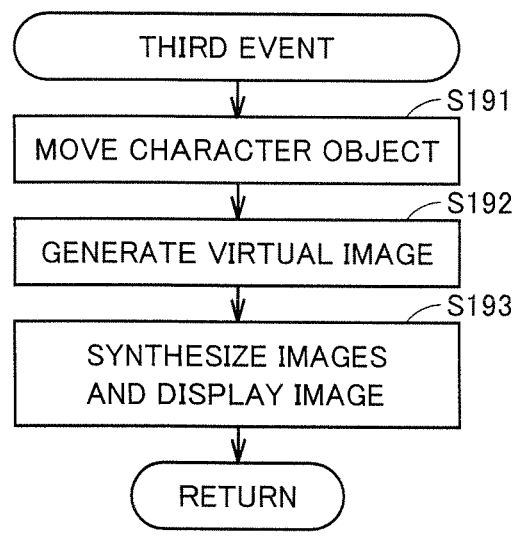
FIG. 17 shows an exemplary illustrative non-limiting flowchart for illustrating processing of a third event shown in FIG. 14.

Processing of the third event that occurred will now be described with reference to FIG. 17. Initially, CPU 311 moves arranged character object 61 (step S191). Specifically, CPU 311 determines a direction of movement and a moving speed of character object 61 based on virtual object information D13 read from main memory 32. For example, CPU 311 determines that character object 61 is to be moved at a slow speed in a direction of button object 60 pressed by the user. Then, when CPU 311 moved character object 61 based on the determination, CPU 311 updates a position of moved character object 61.

CPU 311 generates a virtual image in the virtual space by picking up an image of the virtual space including moving character object 61 with the virtual camera (step S192). Specifically, CPU 311 generates left virtual space image D17 by rendering moving character object 61 based on the left virtual camera and generates right virtual space image D18 by rendering moving character object 61 based on the right virtual camera.

It is noted that, by using the virtual camera arranged in the processing of the second event, it is not necessary to again arrange the virtual camera. If the virtual camera is to be arranged again, CPU 311 again calculates positional relation between outer image pick-up portions 23*a*, 23*b* and marker 50 and again arranges a pair of virtual cameras (the left virtual camera and the right virtual camera) in the virtual space based on the positional relation again calculated.

After the virtual image is generated, CPU 311 synthesizes the image of the subject with the virtual image and causes upper LCD 22 to display the resultant image (step S193). Specifically, CPU 311 successively overwrites left subject image D14 with moving character object 61 rendered based on the left virtual camera and successively overwrites right subject image D15 with moving character object 61 rendered based on the right virtual camera. Thus, the user can be caused to recognize that character object 61 moves in the virtual space. It is noted that, similarly, the synthesized image is displayed on upper LCD 22. Namely, CPU 311 causes upper LCD 22 to display a 3D image, with the synthesized image of left subject image D14 and left virtual space image D17 serving as an image for left eye and the synthesized image of right subject image D15 and right virtual space image D18 serving as an image for right eye.

Referring back to FIG. 14, CPU 311 ends the game after processing of the third event ended. It is noted that the process may return to step S12 and CPU 311 may continue processing for detecting marker 50 from the obtained image of the subject, without ending the game.

As described above, game device 10 obtains an image of a subject picked up by outer image pick-up portion 23, detects marker 50 from the obtained image of the subject, causes an event to occur in the virtual space in accordance with variation in number of markers 50 that can be detected, generates a virtual image by shooting the event that occurs with a virtual camera arranged in the virtual space, and causes upper LCD 22 to display the virtual image such that the virtual image is visually recognized by the user as superimposed on the image of the subject. Thus, more visual effects for having the user actually feel augmented reality by making use of marker 50 can be given.

(Variation)

In the embodiment above, a case where outer marker 50a cannot be detected because a part of outer marker 50a is hidden by a user's hand and hence the number of markers 50 that can be detected is varied has been described, however, game device 10 is not limited as such. For example, as shown in FIGS. 18 and 19, game device 10 may vary the number of markers 50 that can be detected, by varying the number of markers 50 of which images are picked up by outer image pick-up portion 23.

Figure 18:
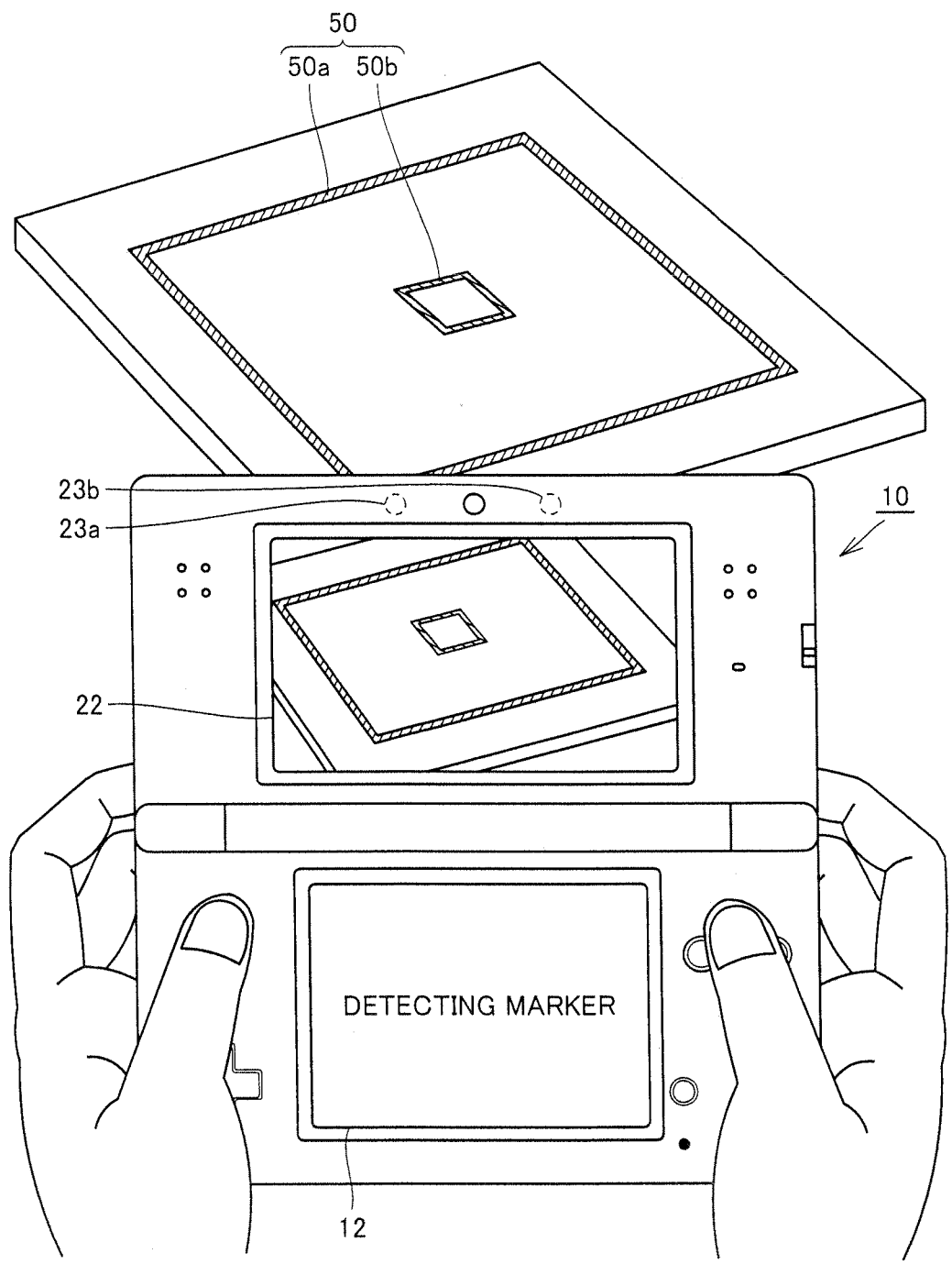
FIGS. 18 and 19 each show an exemplary illustrative non-limiting game image of the exemplary non-limiting game device according to another exemplary embodiment while the game is being played.
Figure 19:
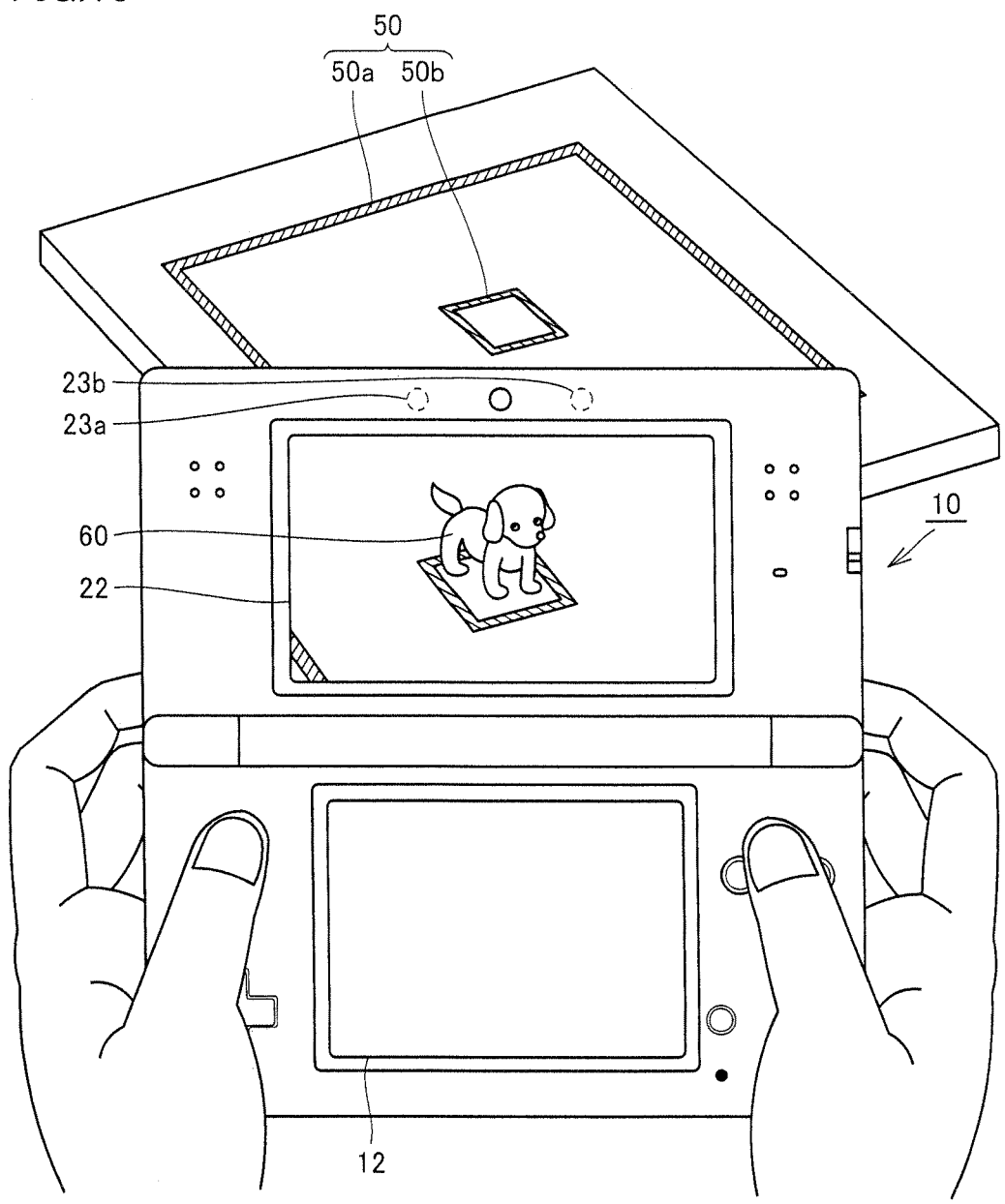

As shown in FIG. 18, game device 10 picks up an image of a subject such that the image of the subject currently picked by outer image pick-up portion 23 includes outer marker 50a and inner marker 50b. Namely, game device 10 picks up an image of the subject with a distance from the subject being sufficiently secured. Here, since the image of the subject includes outer marker 50a and inner marker 50b, game device 10 can detect outer marker 50a and inner marker 50b.

Then, the user brings game device 10 closer to the subject. As shown in FIG. 19, when game device 10 is brought closer to the subject, game device 10 picks up an image of the subject such that the image of the subject currently picked up by outer image pick-up portion 23 includes only inner marker 50b. Here, since the image of the subject includes only inner marker 50b, game device 10 cannot detect outer marker 50a but can detect only inner marker 50b. As the number of markers 50 that can be detected varies, game device 10 causes an event to occur. As a result of the event that occurred, as shown in FIG. 19, upper LCD 22 displays character object 61 within inner marker 50b.

As described above, by bringing game device 10 closer to the subject, the number of markers 50 that can be detected can be varied. It is noted that, by moving game device 10 away from the subject, inner marker 50b will be in such a size as undetectable and hence the number of markers 50 that can be detected can also be varied. Alternatively, the number of markers 50 that can be detected can be varied also by moving a part of outer marker 50a out of the frame, without changing a distance of game device 10 from the subject.

In addition, in the embodiment above, upper LCD 22 displays a synthesized image of an image of the subject picked up by outer image pick-up portion 23 and a virtual image (a video see-through type), however, the embodiment is not limited as such. In other embodiments, such an optical see-through type game device (for example, a game device including a head-mount display) or game system that a virtual object is displayed on a transmissive type display screen and the virtual object is visually recognized by the user as if the virtual object were actually present in the subject seen through the transmissive type display screen is also applicable.

Moreover, in the embodiment above, though a position and an orientation of the left virtual camera and a position and an orientation of the right virtual camera are individually determined in accordance with results in the marker detection processing, in other embodiments, a position and an orientation of any one virtual camera may be determined in accordance with results in the marker detection processing and thereafter a position and an orientation of the other virtual camera may be determined based on the position and the orientation of one virtual camera.

Further, in the embodiment above, though a position and an orientation of the virtual camera are determined based on a position and an orientation of marker 50 included in the image of the subject, in other embodiments, a position or the like of the virtual camera may be determined based on a position or the like of a recognition target (for example, a face, a hand, and the like) other than marker 50 included in the image of the subject.

Furthermore, in the embodiment above, though an example where a stereoscopic image is displayed on upper LCD 22 has been described, a case where a two-dimensional image is displayed is also applicable, without limited as such. For example, one virtual camera should only be arranged in the virtual space based on the image of the subject obtained from any one of outer image pick-up portion (left) 23a and outer image pick-up portion (right) 23b and then processing as in the embodiment above should only be performed.

In addition, in the embodiment above, though an example in which processing of game program D11 is performed by the CPU (CPU 311) has been described, in other embodiments, at least partial processing of game program D11 may be performed only by hardware.

Moreover, in the embodiment above, though description has been given with reference to the game example above, the embodiment is applicable to any such game as causing an event to occur as the number of markers 50 that can be detected varies, without limited as such. Any application software is also applicable, without limited to game software.

Further, in the embodiment above, though an example where a note where marker 50 is drawn is used has been described, a case where marker 50 is drawn on a common credit card or a card having a size as large as a business card is also applicable, without limited as such. Here, a card in which marker 50 is drawn may simply be referred to as a marker.

Furthermore, in the embodiment above, though portable game device 10 has been described, in other embodiments, any information processing apparatus (a stationary game device, a desktop personal computer, a notebook personal computer, a portable telephone, and the like) may be made use of as a game device or a game system.

In addition, in the embodiment above, though an example where processing of game program D11 is performed by a single CPU (CPU 311) has been described, in other embodiments, processing of game program D11 may be performed by a plurality of processors as distributed. The plurality of processors may be contained in the same information processing apparatus or may be provided as distributed in a plurality of information processing apparatuses capable of communicating with one another, such as a server apparatus and a client apparatus.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer readable information processing program and executable by a computer of an information processing apparatus connected to an image pick-up apparatus and a display, said information processing program comprising:

image obtaining instructions for obtaining an image of a subject picked up by said image pick-up apparatus;

search target detection instructions for detecting a search target from the image of said subject obtained in accordance with said image obtaining instructions;

event occurrence instructions for causing an event to occur in a virtual space when the number of the detected search targets is varied while at least one search target is detected, wherein the event is that a character object moves in the virtual space;

virtual image generation instructions for generating a virtual image by shooting said event that occurs in accordance with said event occurrence instructions with a virtual camera arranged in said virtual space; and display control instructions for causing said display to display said virtual image such that it is visually recognized by a user as superimposed on the image of said subject or on said subject seen through a screen of said display.

2. The non-transitory storage medium according to claim 1, wherein
said search target includes a first search target and a second search target arranged as encompassed in said first search target, and
said event occurrence instructions are adapted to cause the event to occur in accordance with the number of said first search targets and said second search targets that can be detected in accordance with said search target detection instructions.

3. The non-transitory storage medium according to claim 2, wherein
said event occurrence instructions are adapted to
cause a first event to occur when said first search target and said second search target is successfully detected in accordance with said search target detection instructions, and
cause a second event to occur when only said second search target is successfully detected in accordance with said search target detection instructions, subsequent to occurrence of said first event.

4. The non-transitory storage medium according to claim 2, wherein
said display control instructions are adapted to display a guide at a position corresponding to said first search target detected in accordance with said search target detection instructions.

5. The non-transitory storage medium according to claim 4, wherein
said display control instructions are adapted to display said guide urging said user to take such an action as varying the number of said first search targets and said second search targets that can be detected in accordance with said search target detection instructions.

6. The non-transitory storage medium according to claim 1, wherein
said event that occurred in accordance with said event occurrence instructions includes arrangement of an object in a prescribed shape in said virtual space, and
said virtual image generation instructions are adapted to generate said virtual image by shooting the object in said prescribed shape with said virtual camera.

7. The non-transitory storage medium according to claim 6, wherein
said event that occurred in accordance with said event occurrence instructions includes arrangement of a plate-shaped polygon in said virtual space, and said virtual image generation instructions are adapted to generate said virtual image by mapping a texture on said plate-shaped polygon and shooting the polygon with said virtual camera.

8. The non-transitory storage medium according to claim 1, wherein
said information processing program further comprises:
position calculation instructions for calculating positional relation between said image pick-up apparatus and said search target based on the image of said subject; and
virtual camera arrangement instructions for arranging said virtual camera in accordance with said positional relation calculated in accordance with said position calculation instructions.

9. The non-transitory storage medium according to claim 3, wherein
said information processing program further comprises:
first search target position detection instructions for detecting a position of the first search target from the image of said subject;
first search target position calculation instructions for calculating positional relation between said image pick-up apparatus and said first search target based on the position detected in accordance with said first search target position detection instructions; and
virtual camera arrangement instructions for arranging said virtual camera in accordance with the positional relation calculated in accordance with said first search target position calculation instructions, wherein
said virtual image generation instructions are adapted to generate said virtual image by shooting with said virtual camera, at least said second event that occurs in accordance with said event occurrence instructions.

10. An information processing apparatus connected to an image pick-up apparatus and a display, comprising:
an imager arranged to obtain an image of a subject picked up by said image pick-up apparatus;
a search target detector arranged to detect a search target from the image of said subject obtained by said imager;
an event generator arranged to cause an event to occur in a virtual space when the number of the detected search targets is varied while at least one search target is detected, wherein the event is that a character object moves in the virtual space;
a virtual image generator arranged to generate a virtual image by shooting said event that occurs by means of said event generator with a virtual camera arranged in said virtual space; and
a display controller arranged to cause said display to display said virtual image such that it is visually recognized by a user as superimposed on the image of said subject or on said subject seen through a screen of said display.

11. An information processing method processed by a control unit of an information processing apparatus connected to an image pick-up apparatus and a display, comprising:
obtaining an image of a subject picked up by said image pick-up apparatus;
detecting a search target from the obtained image of said subject;
causing an event to occur in a virtual space when the number of the detected search targets is varied while at least one search target is detected, wherein the event is that a character object moves in the virtual space;
generating a virtual image by shooting said event that occurs with a virtual camera arranged in said virtual space; and causing said display to display said virtual image such that it is visually recognized by a user as superimposed on the image of said subject or on said subject seen through a screen of said display.

12. An information processing system, comprising:
a search target arranged in a subject;
an image pick-up apparatus for picking up an image of said subject;
an information processing apparatus connected to said image pick-up apparatus; and
a display connected to said information processing apparatus,
said information processing apparatus including
an imager arranged to obtain the image of the subject picked up by said image pick-up apparatus,
a search target detector arranged to detect said search target from the image of said subject obtained by said imager,
an event generator arranged to cause an event to occur in a virtual space when the number of the detected search targets is varied while at least one search target is detected, wherein the event is that a character object moves in the virtual space,
a virtual image generator arranged to generate a virtual image by shooting said event that occurs by means of said event generator with a virtual camera arranged in said virtual space, and
a display controller arranged to cause said display to display said virtual image such that it is visually recognized by a user as superimposed on the image of said subject or on said subject seen through a screen of said display.

13. The non-transitory storage medium according to claim 1, wherein
the number of the detected search targets is varied due to a user physically contacting said subject.

14. The non-transitory storage medium according to claim 1, wherein
an event occurs when a portion of the search targets which have been detected becomes undetected.

15. The non-transitory storage medium according to claim 1, wherein
a virtual image is displayed at a position related to the position at which the search target is detected.

* * * * *